(12) United States Patent
Itkin

(10) Patent No.: US 12,499,220 B2
(45) Date of Patent: Dec. 16, 2025

(54) SECURE REMOTE RESET

(71) Applicant: MELLANOX TECHNOLOGIES, LTD., Yokneam (IL)

(72) Inventor: Yuval Itkin, Zoran (IL)

(73) Assignee: Mellanox Technologies, Ltd, Yokneam (IL)

( * ) Notice: Subject to any disclaimer, the term of this patent is extended or adjusted under 35 U.S.C. 154(b) by 322 days.

(21) Appl. No.: 17/694,725

(22) Filed: Mar. 15, 2022

(65) Prior Publication Data
US 2023/0297669 A1 Sep. 21, 2023

(51) Int. Cl.
| | |
|---|---|
| *G06F 21/55* | (2013.01) |
| *G06F 21/56* | (2013.01) |
| *G06F 21/60* | (2013.01) |
| *G06F 21/64* | (2013.01) |
| *G06F 21/10* | (2013.01) |

(52) U.S. Cl.
CPC .......... *G06F 21/554* (2013.01); *G06F 21/564* (2013.01); *G06F 21/602* (2013.01); *G06F 21/64* (2013.01); *G06F 21/107* (2023.08)

(58) Field of Classification Search
CPC .... G06F 21/554; G06F 21/564; G06F 21/602; G06F 21/64; G06F 21/107
See application file for complete search history.

(56) References Cited

U.S. PATENT DOCUMENTS

| | | | |
|---|---|---|---|
| 11,256,644 B2 | 2/2022 | Mekad et al. | |
| 2005/0257041 A1* | 11/2005 | Wallenstein | G06F 21/575 713/2 |
| 2009/0205028 A1* | 8/2009 | Smeets | H04L 9/321 726/6 |
| 2009/0217043 A1* | 8/2009 | Metke | H04W 12/069 713/171 |
| 2009/0234986 A1* | 9/2009 | Yuhara | G06F 11/2092 710/36 |
| 2011/0307694 A1 | 12/2011 | Broustis et al. | |

(Continued)

OTHER PUBLICATIONS

Advanced Micro Devices, Inc., "Magic Packet Technology", White Paper, pp. 1-6, year 1998.

(Continued)

*Primary Examiner* — Jason K Gee
*Assistant Examiner* — Judy Bazna
(74) *Attorney, Agent, or Firm* — Meitar Patents Ltd.; Daniel Kligler

(57) ABSTRACT

In one embodiment, a system includes data communication device including a network interface to receive a nonce supply request from a remote machine, processing core(s), processing circuitry to generate a nonce, sign the nonce with a private key of the data communication device yielding a first digital signature, provide the nonce and first digital signature to the remote machine, receive, from the remote machine, a secure reset request including a second digital signature of the nonce signed with a private key of the remote machine, verify the second digital signature with a public key of the remote machine to verify that the remote machine provided the secure reset request and that the nonce signed by the second digital signature is the same nonce provided to the remote machine, and issue a reset command to the processing core(s) to reboot responsively to the verification of the second digital signature.

20 Claims, 4 Drawing Sheets

(56) References Cited

U.S. PATENT DOCUMENTS

| | | | |
|---|---|---|---|
| 2016/0259667 A1* | 9/2016 | Bailey | G06F 9/4893 |
| 2017/0177457 A1* | 6/2017 | Swanson | G06F 11/1016 |
| 2018/0081698 A1* | 3/2018 | Byon | G06F 9/4418 |
| 2018/0165480 A1* | 6/2018 | Raju | G06F 21/88 |
| 2019/0361073 A1 | 11/2019 | Trantham | |
| 2021/0099292 A1* | 4/2021 | Gilton | H04L 9/3247 |
| 2022/0052849 A1* | 2/2022 | Kasso | H04L 67/143 |
| 2022/0113915 A1* | 4/2022 | Ki | G06F 3/0604 |
| 2022/0400124 A1* | 12/2022 | Chasdai | H04L 63/1416 |
| 2024/0012673 A1* | 1/2024 | Garbett | G06F 11/0751 |

OTHER PUBLICATIONS

Nvidia Corporation, "Nvidia Bluefield-3 DPU, Programmable Data Center Infrastructure On-A-Chip", Product Information, pp. 1-2, year 2021.

ARM, "Microprocessor Cores and Processor Technology—Processor IP for the Widest Range of Devices," p. 1-5, ARM Limited, years 1995-2022, as downloaded from https://www.arm.com/products/silicon-ip-cpu.

"Common Management Interface Specification (CMIS)", Rev. 5.0, pp. 1-300, May 8, 2021.

STMicroelectronics, "STSAFE-A110 Authentication, State-Of-The-Art Security for Peripherals on IoT Devices" Datasheet, pp. 1-36, Dec. 2019.

STMicroelectronics, "M2646, Getting Started with the X-CUBE-SAFEA1 Software Package", User Manual, pp. 1-23, year 2022.

Itkin et al., U.S. Appl. No. 17/745,906, filed May 17, 2022.

U.S. Appl. No. 17/745,906 Office Action dated May 28, 2024.

\* cited by examiner

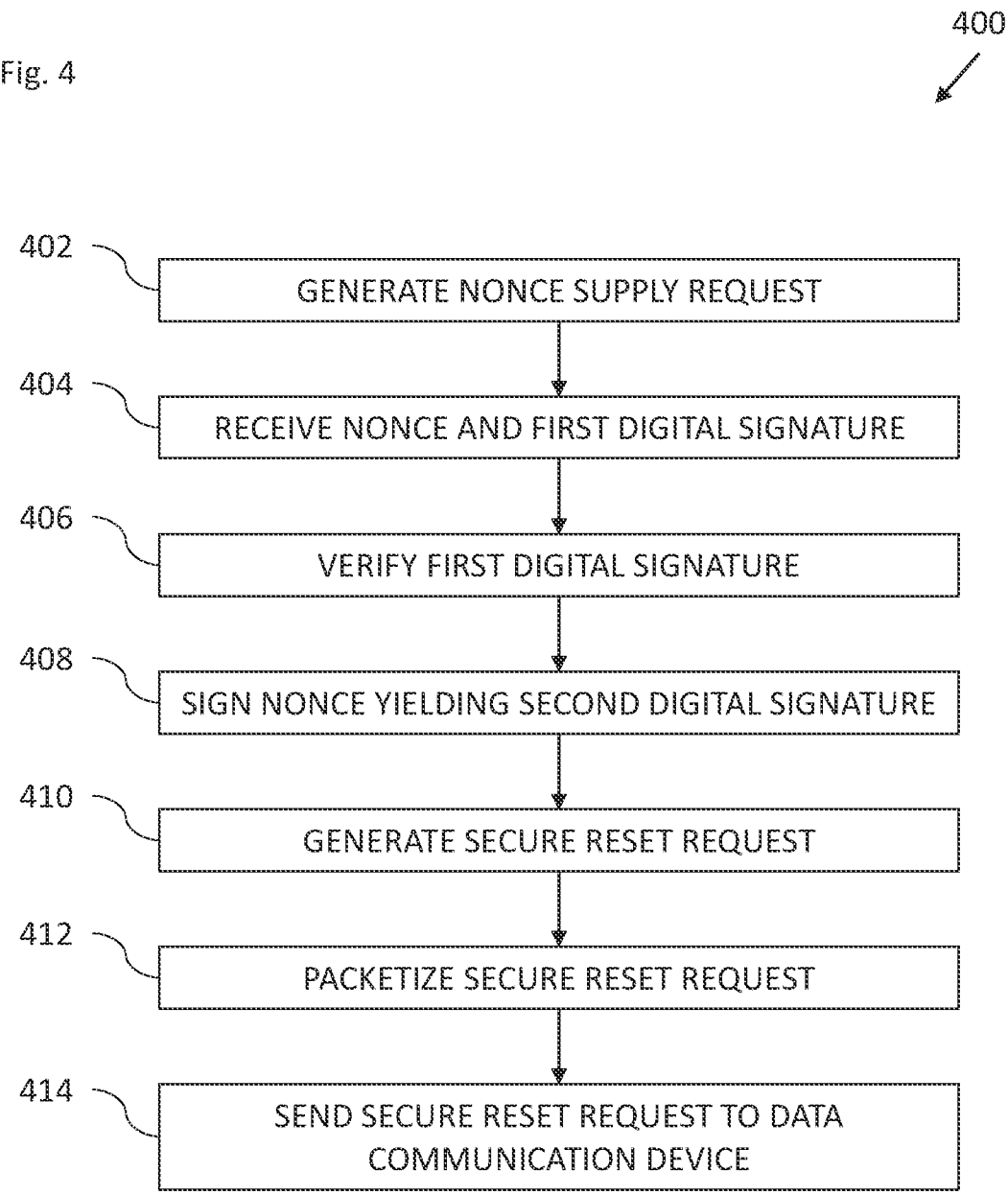

SECURE REMOTE RESET

FIELD OF THE INVENTION

The present invention relates to computer system, and in particular, but not exclusively, secure reboot of processors.

BACKGROUND

A SmartNIC may include a programmable accelerator that makes data center networking, security and storage efficient and flexible. SmartNICs offload from server CPUs an array of jobs required to manage modern distributed applications. They may pack a variety of connected, often configurable units, which make decisions on how to process and route packets of data as they flow through the data center.

Most of the configurable units are specialized hardware units called accelerators that run communication jobs more efficiently than CPUs. Some are flexible programmable cores that users can program to handle their changing needs and keep up with network protocols as they evolve. This combination of accelerators and programmable cores help SmartNICs deliver both performance and flexibility.

NVIDIA® produces SmartNICs such as Bluefield-3 which handle a list of networking, security and storage jobs. For example, the Smart NICs may accelerate popular and custom software-defined networking stacks, provide security with in-line encryption/decryption, enable firewalls and a hardware root-of-trust for a secure boot, run popular security protocols such as Transport Layer Security (TLS), IP Security, and MAC Security, handle storage and data-access protocols such as RoCE, GPUDirect, NVM Express and Transmission Control Protocol, and support virtualized data centers with Single-Root input/output (I/O) Virtualization and virtual switching and routing.

SUMMARY

There is provided in accordance with an embodiment of the present disclosure, a system including data communication device including a network interface to receive a nonce supply request from a remote machine over a network, at least one processing core, processing circuitry to generate a nonce, sign the nonce with a private key of the data communication device yielding a first digital signature of the nonce, provide the nonce and the first digital signature to the remote machine, receive, from the remote machine, a secure reset request including a second digital signature of the nonce signed by the remote machine with a private key of the remote machine, verify the second digital signature with a public key of the remote machine to verify that the remote machine provided the secure reset request and that the nonce signed by the second digital signature is the same nonce provided to the remote machine, and issue a reset command to the at least one processing core to reboot responsively to the verification of the second digital signature.

Further in accordance with an embodiment of the present disclosure the processing circuitry is to sign and provide the nonce in a first stage, and receive the secure reset request from the remote machine in a second stage.

Still further in accordance with an embodiment of the present disclosure the processing circuitry is to delete the nonce responsively to the verification of the second digital signature to prevent a replay attack based on the nonce.

Additionally in accordance with an embodiment of the present disclosure the data communication device is to reboot the at least one processing core without rebooting any CPU of any host device connected to the data communication device.

Moreover, in accordance with an embodiment of the present disclosure the processing circuitry includes a Wake-on-LAN (WoL) detector to detect the receipt of the secure reset request from the remote machine.

Further in accordance with an embodiment of the present disclosure the processing circuitry includes at least one reduced instruction set computer (RISC) processor to run firmware to sign the nonce with the private key of the data communication device yielding the first digital signature of the nonce, provide the nonce and the first digital signature to the remote machine, receive, from the remote machine, the secure reset request including the second digital signature of the nonce signed by the remote machine with the private key of the remote machine, verify the second digital signature with the public key of the remote machine to verify that the remote machine provided the secure reset request and that the nonce signed by the second digital signature is the same nonce provided to the remote machine, and issue the reset command to the at least one processing core to reboot responsively to the verification of the second digital signature.

Still further in accordance with an embodiment of the present disclosure the processing circuitry includes at least one hardware accelerator to perform any one or more of the following generate the nonce, detect the receipt of the secure reset request from the remote machine, sign the nonce with the private key of the data communication device, and verify the second digital signature with the public key of the remote machine.

Additionally in accordance with an embodiment of the present disclosure the processing circuitry is to send a notification to the remote device responsively to the at least one processing core being rebooted.

Moreover, in accordance with an embodiment of the present disclosure the at least one processing core includes multiple processing cores.

Further in accordance with an embodiment of the present disclosure the data communication device includes a data processing unit (DPU) including a network interface controller, the network interface, the at least one processing core, and the processing circuitry.

Still further in accordance with an embodiment of the present disclosure, the system includes the remote machine to generate the nonce supply request, send the nonce supply request to the data communication device, receive the nonce and the first digital signature from the data communication device, verify the first digital signature responsively to a public key of the data communication device and the nonce, sign the nonce with the private key of the remote machine yielding the second digital signature, and generate the secure reset request including the second digital signature, and send the secure reset request to the data communication device.

Additionally in accordance with an embodiment of the present disclosure the remote machine is to sign the nonce and generate the secure reset request at a later stage.

Moreover, in accordance with an embodiment of the present disclosure the remote machine is to packetize the secure reset request to be detected using a Wake-on-LAN (WoL) detector.

Further in accordance with an embodiment of the present disclosure the remote machine is configured to sign the nonce and generate the secure reset request at a later stage.

Still further in accordance with an embodiment of the present disclosure the remote machine is configured to packetize the secure reset request to be detected using a Wake-on-LAN (WoL) detector.

Additionally in accordance with an embodiment of the present disclosure the processing circuitry is configured to sign and provide the nonce in a first stage, and receive the secure reset request from the remote machine in a second stage.

Moreover, in accordance with an embodiment of the present disclosure the processing circuitry is configured to delete the nonce responsively to the verification of the second digital signature to prevent a replay attack based on the nonce.

Further in accordance with an embodiment of the present disclosure the data communication device is configured to reboot the at least one processing core without rebooting any CPU of any host device connected to the data communication device.

Still further in accordance with an embodiment of the present disclosure the processing circuitry is configured to send a notification to the remote device responsively to the at least one processing core being rebooted.

There is also provided in accordance with another embodiment of the present disclosure, a remote machine including a network interface to share data with data communication device, and processing circuitry to generate a nonce supply request, send the nonce supply request to the data communication device via the network interface over a network, receive from the data communication device a nonce and a first digital signature of the nonce signed by the data communication device with a private key of the data communication device, verify the first digital signature responsively to a public key of the data communication device and the nonce, sign the nonce with a private key of the remote machine yielding a second digital signature, and generate a secure reset request including the second digital signature, and send the secure reset request to the data communication device via the network interface over the network.

There is also provided in accordance with still another embodiment of the present disclosure, a secure reset method, including receiving a nonce supply request from a remote machine over a network, generating a nonce, signing the nonce with a private key of a data communication device yielding a first digital signature of the nonce, providing the nonce and the first digital signature to the remote machine, receiving, from the remote machine, a secure reset request including a second digital signature of the nonce signed by the remote machine with a private key of the remote machine, verifying the second digital signature with a public key of the remote machine to verify that the remote machine provided the secure reset request and that the nonce signed by the second digital signature is the same nonce provided to the remote machine, and issuing a reset command to at least one processing core to reboot responsively to the verification of the second digital signature.

There is also provided in accordance with yet another embodiment of the present disclosure, a secure reset method, including generating a nonce supply request at a remote machine, sending the nonce supply request to a data communication device over a network, receiving from the data communication device a nonce and a first digital signature of the nonce signed by the data communication device with a private key of the data communication device, verifying the first digital signature responsively to a public key of the data communication device and the nonce, signing the nonce with a private key of the remote machine yielding a second digital signature, generating a secure reset request including the second digital signature, and sending the secure reset request to the data communication device over the network.

BRIEF DESCRIPTION OF THE DRAWINGS

The present invention will be understood from the following detailed description, taken in conjunction with the drawings in which:

FIG. 4 is a flowchart including steps in a method performed by a remote machine in the system of FIG. 1.

DESCRIPTION OF EXAMPLE EMBODIMENTS

Overview

Figure 1:
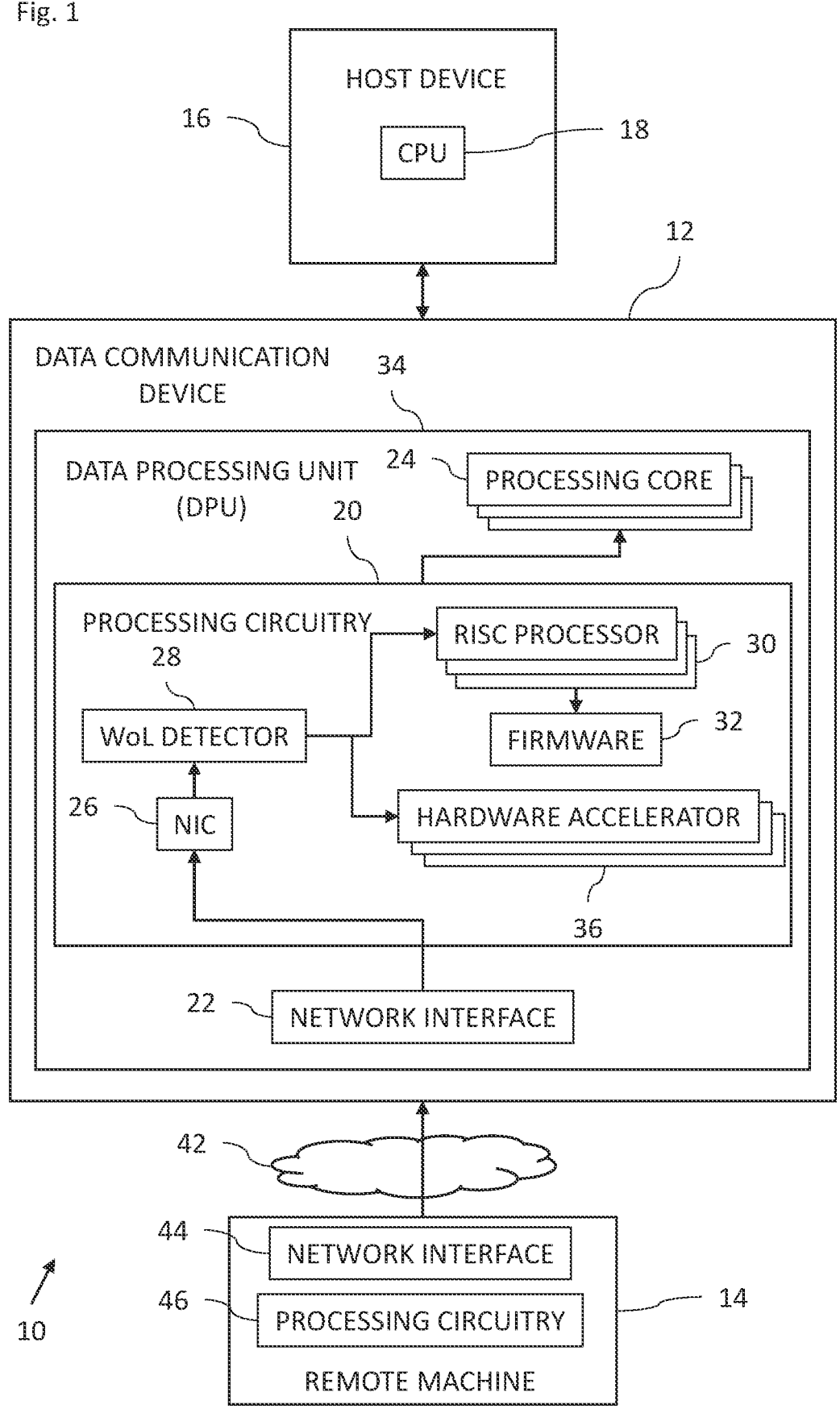
FIG. 1 is a block diagram view of a secure reset system constructed and operative in accordance with an embodiment of the present invention.

As previously mentioned, a SmartNIC also known as a data processing unit (DPU) may include a network interface controller (including a physical layer (PHY) unit and MAC unit), accelerators, and processors (e.g. ARM® core processors). The various components may be implemented on the same silicon or using different chips mounted on a printed circuit board.

A DPU may need to be reset (e.g., rebooted) remotely, for example to install new software or deal with a problem when the DPU is less responsive or non-responsive, by sending a reset command to the DPU. In order to prevent illicit reset of the device, the reset process needs to be performed securely.

The DPU may be connected to one or more host devices (e.g., in a single or multi-host environment). The DPU may be managed by a network provider, whereas the host(s) may be managed by, owned by, or leased to, one or more different entities. Therefore, it may be important to enforce separation between host(s) and the connected DPU. For example, in a cloud environment a host may be leased to one or more tenants, whereas the network infrastructure (including the DPUs) is owned by a datacenter owner who does not want to provide control of the network infrastructure to the tenant. This raises a problem of trust and security as the datacenter owner does not want any entity raising a command to reset the DPU. Therefore, resetting the DPU may need to be performed without resetting the connected host device(s) and in a secure manner.

Embodiments of the present invention solve at least some of the above problems by providing a secure remote reset system and method. In a first (setup) stage, a remote machine requests a nonce (which is typically device-specific and one-time use) from the DPU. The DPU generates a random or pseudo-random nonce and a digital signature of the nonce using a private key of the DPU. The DPU sends the nonce and the digital signature to the remote machine. The remote machine receives the nonce and the digital signature and verifies that the nonce was generated by the DPU by checking the digital signature using the supplied nonce and a corresponding public key of the DPU.

At a later stage, when it is desired to reset (i.e., reboot) the DPU or one or more processors of the DPU, the remote machine signs the nonce with a private key of the remote device yielding a signature which is included in a secure reset request sent to the DPU. The DPU receives the secure reset request and verifies the signature included in the secure reset request using a corresponding public key of the remote device and the nonce stored by the DPU to ensure that the nonce used by the remote device to generate the signature is the same nonce provided earlier by the DPU and that the secure reset request originates with the remote device. Upon verification of the signature, the DPU issues a reset command to one or more processors of the DPU to self-reset. The nonce stored by the DPU is generally deleted to prevent a replay attack based on the nonce, so that the same nonce cannot be used more than once. Once reset is completed, the DPU sends a notification to the remote machine to confirm that reset has occurred.

System Description

Reference is now made to FIG. 1, which is a block diagram view of a secure reset system 10 constructed and operative in accordance with an embodiment of the present invention.

The secure reset system 10 includes data communication device 12 and a remote machine 14. The data communication device 12 and remote machine 14 may be connected via a network 42. The remote machine 14 include a network interface 44 to share data with data communication device 12, and processing circuitry 46, described in more detail with reference to FIG. 4. The data communication device 12 may be connected via a suitable interface to one or more host devices 16 (only one shown for the sake of simplicity). Each host device 16 may include a central processing unit 18.

The data communication device 12 includes processing circuitry 20, a network interface 22, and one or more processing cores 24, e.g., ARM processing cores. The processing core(s) 24 runs its own operating system(s) and is separate from the central processing unit 18 of the host device 16. The processing circuitry 20 includes: a network interface controller 26, which may include a PHY and MAC unit; a Wake-on-LAN (WoL) detector 28; one or more hardware accelerators 36; and one or more reduced instruction set computer (RISC) processors 30 (or any other suitable processor(s)) configured to run firmware 32.

Wake-on-LAN (WoL) is an Ethernet or Token Ring computer networking standard that allows a computer or processor to be turned on or awakened by a network message. The network message is usually sent to the target computer or processor by a program executed on a device connected to the same local area network. The Wake-on-LAN detector 28 is configured to recognize WoL-type packets typically without degrading performance of the NIC. Therefore, Wake-on-LAN detector 28 may be used to automatically detect WoL-type packets. The WoL-type packets may include additional information that secures the security of a flow.

In some embodiments, the data communication device 12 includes a data processing unit (DPU) 34 (e.g., SmartNIC), which includes the processing core(s) 24, processing circuitry 20 (which includes the network interface controller 26, Wake-on-LAN detector 28, reduced instruction set computer processor(s) 30), and the network interface 22. In other embodiments, the data communication device 12 is implemented as a switch which is managed by an embedded CPU (e.g., the processing core(s) 24) and the switch is configured to reset the embedded CPU.

Figure 2:
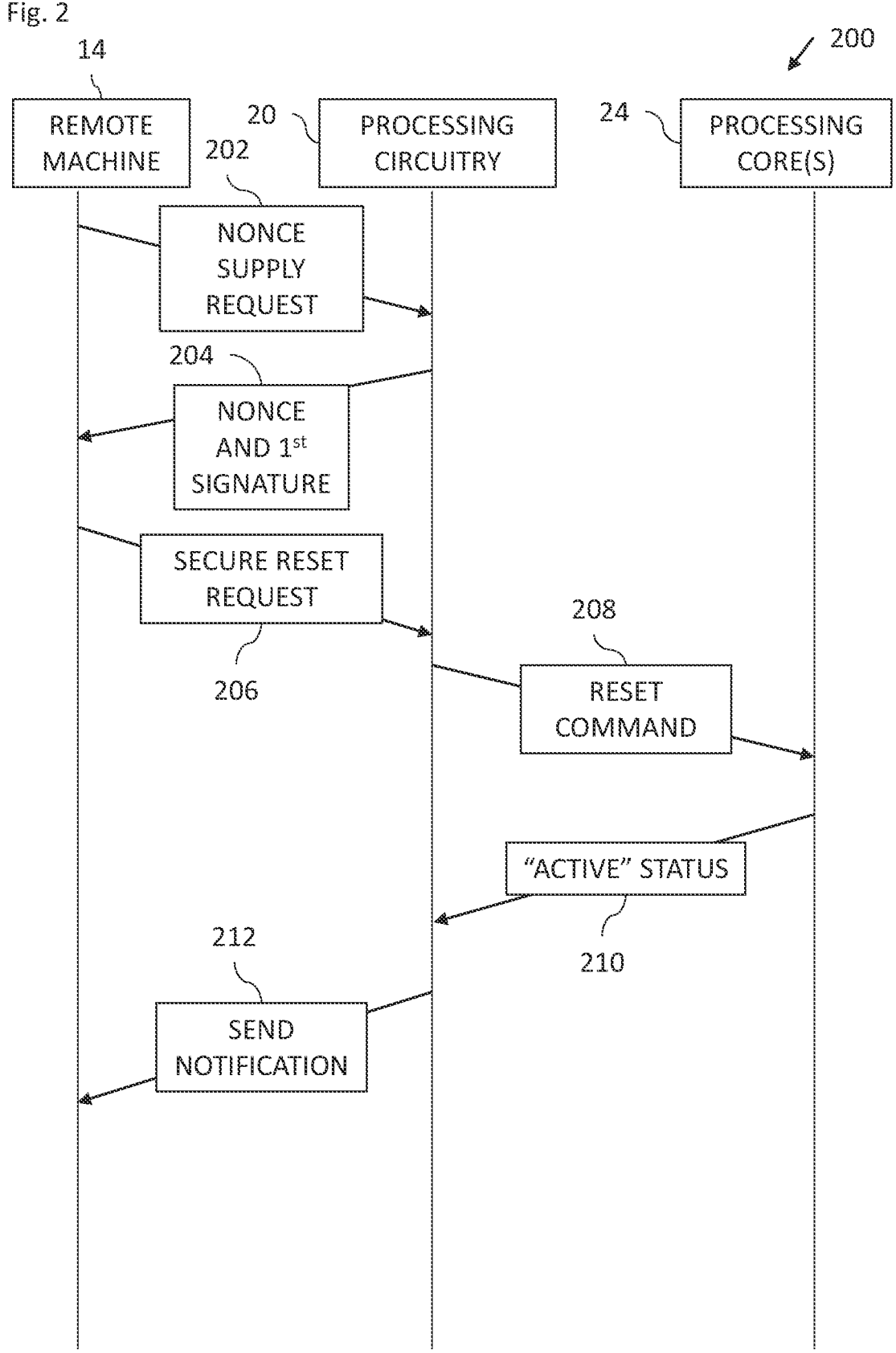
FIG. 2 is an information flow diagram illustrating a method of operation of the system of FIG. 1.
Figure 3:
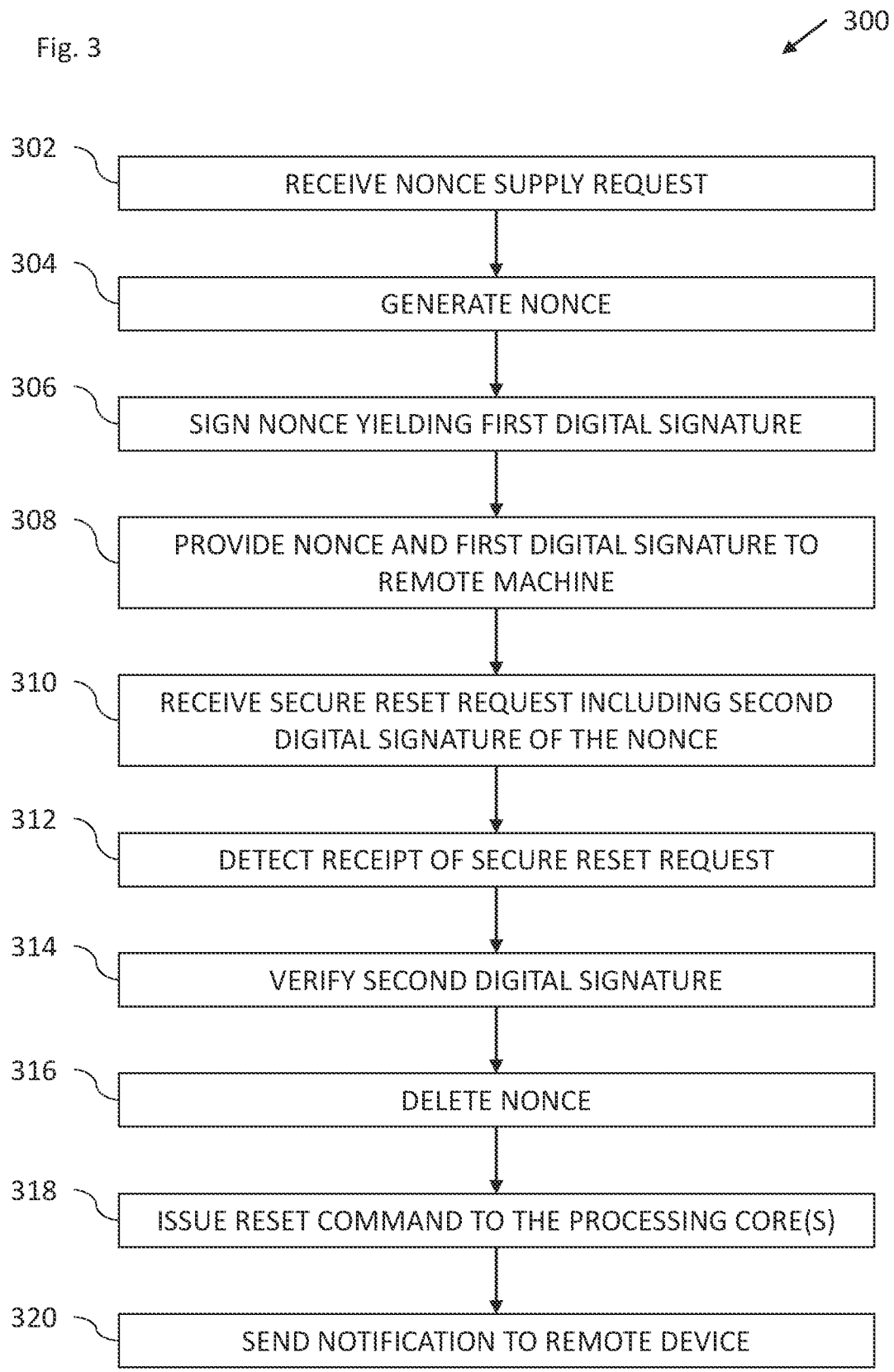
FIG. 3 is a flowchart including steps in a method performed by data processing device in the system of FIG. 1.

Reference is now made to FIG. 2, which is an information flow diagram 200 illustrating a method of operation of the system 10 of FIG. 1. Reference is also made to FIG. 3, which is a flowchart 300 including steps in a method performed by data processing device 12 in the system 10 of FIG. 1.

The network interface 22 is configured to receive a nonce supply request (block 202) from the remote machine 14 over the network 42 (block 302). The processing circuitry 20 is configured to generate a nonce (block 304) (for example by generating a random or pseudo-random number) and store the nonce for later retrieval in a memory (not shown) of the data communication device 12. The processing circuitry 20 is configured to sign the nonce with a private key of the data communication device 12 yielding a first digital signature of the nonce (block 306). The processing circuitry 20 is configured to provide the nonce and the first digital signature (block 204) to the remote machine 14 over the network 42 (block 308).

The processing circuitry 20 is configured to receive from the remote machine 14 a secure reset request (block 206) including a second digital signature of the nonce signed by the remote machine 14 with a private key of the remote machine 14 and optionally the nonce (block 310), In some embodiments, the secure reset request (block 206) is generated to be detectable by the Wake-on-LAN detector 28, which is configured to detect the receipt of the secure reset request (block 206) from the remote machine 14 (block 312). In some embodiments, the hardware accelerator(s) 36 may be configured to detect the receipt of the secure reset request (block 206) from the remote machine 14.

The processing circuitry 20 is configured to verify the second digital signature (received in the secure reset request (block 206)) with a public key of the remote machine 14 (corresponding to the private key of the remote machine 14 mentioned above) and the nonce stored by the data communication device 12 to verify that the remote machine 14 provided the secure reset request (block 206) and that the nonce signed by the second digital signature is the same nonce previously provided to the remote machine 14 (block 314).

The processing circuitry 20 is optionally configured to delete the stored nonce responsively to the verification of the second digital signature to prevent a replay attack based on the nonce so that the same nonce cannot be used more than once (block 316). The processing circuitry 20 is configured to issue a reset command (block 208) to the processing core(s) 24 to reboot responsively to the verification of the second digital signature (block 318), The data communication device 12 is to reboot the processing core(s) 24 without rebooting any CPU of any host device connected to the data communication device 12. The processing circuitry 20 of the data communication device 12 is configured to receive an "active" status update (block 210) from the processing core(s) 24 indicating that the processing core(s) 24 have been reset (e.g., rebooted). The processing circuitry 20 is configured to send a notification (block 212) to the remote device 14 responsively to the processing core(s) 24 being rebooted (block 320).

In some embodiments, the steps of blocks 302-308 are performed in a first stage of the method, while the steps of blocks 310-320 are performed in a second stage of the method.

In some embodiments, the RISC processor(s) 30 run the firmware 32, which is configured to perform any one or more of the steps of blocks 304-320. In some embodiments, the accelerator(s) is configured to perform any one or more of the steps of blocks 304, 306, 314, or 316.

In practice, some or all of the functions of the processing circuitry 20 may be combined in a single physical component or, alternatively, implemented using multiple physical components. These physical components may comprise hard-wired or programmable devices, or a combination of the two. In some embodiments, at least some of the functions of the processing circuitry 20 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Reference is now made to FIG. 4, which is a flowchart 400 including steps in a method performed by the remote machine 14 of the system 10 of FIG. 1. Reference is also made to FIG. 2.

The processing circuitry 46 of the remote machine 14 is configured to generate the nonce supply request (block 202) and send the nonce supply request (block 202) to the data communication device 12 (block 402). The processing circuitry 46 is configured to receive the nonce and the first digital signature (block 204) from the data communication device 12 (block 404). The processing circuitry 46 is configured to verify the first digital signature responsively to the public key of the data communication device 12 (corresponding to the private key of the data communication device 12 used to generate the first digital signature) and the nonce (block 406). The processing circuitry 46 is configured to sign the nonce with the private key of the remote machine yielding the second digital signature (block 408). The processing circuitry 46 is configured to generate the secure reset request (block 206) including the second digital signature (block 410) and optionally including the nonce (originally generated by the processing circuitry 20 of the data communication device 12). The processing circuitry 46 is configured to packetize the secure reset request (block 206) to be detected using the Wake-on-LAN (WoL) detector 28 (block 412), The processing circuitry 46 is configured to send the secure reset request (block 206) to the data communication device 12 (block 414).

The processing circuitry 46 is to perform the steps of block 402-406 in an initial stage of the method of FIG. 4, and perform the steps of blocks 408-414 in a later stage of the method of FIG. 4. The nonce query may be refreshed periodically to prevent replay attacks. Once nonce is used to perform a secure reset, the nonce generally becomes stale and a new nonce query is generated by the processing circuitry 46.

In practice, some or all of the functions of the processing circuitry 46 may be combined in a single physical component or, alternatively, implemented using multiple physical components. These physical components may comprise hard-wired or programmable devices, or a combination of the two. In some embodiments, at least some of the functions of the processing circuitry 46 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A method of securing remote selective reset of at least one processing core of a data processing unit (DPU) in a network while preventing illicit reset of the at least one processing core of the DPU, the method comprising:

in a remote selective reset set up phase:
sending a verifiable message supply request to the DPU by a trusted network entity;
receiving, by the DPU, the verifiable message supply request from the trusted network entity over the network;
generating and storing, by the DPU, a verifiable message;
sending, by the DPU, the verifiable message to the trusted network entity over the network; and
receiving, by the trusted network entity, the verifiable message; and in a remote selective reset initiation phase:
using the verifiable message to prevent a replay attack;
signing, by the trusted network entity, the verifiable message with a private key of the trusted network entity to create a digital signature;
sending, by the trusted network entity, a remote selective reset request including the digital signature to the DPU;
receiving, by the DPU, from the trusted network entity over the network the remote selective reset request including the digital signature;
verifying, by the DPU, the digital signature with a public key of the trusted network entity and the verifiable message previously stored by the DPU to verify that the trusted network entity is authorized to request remote selective reset of the at least one processing core and that the stored verifiable message matches the verifiable message used by the trusted network entity to generate the signature; and
issuing, by the DPU, a reset command to selectively reset the at least one processing core of the DPU to self reset while a central processing unit of a host device connected to the DPU remains operational and unaffected by the reset command.

2. The method according to claim 1, further comprising:
signing, by the DPU, the verifiable message with a private key of the DPU yielding another digital signature of the verifiable message;
providing, by the DPU the other digital signature to the trusted network entity over the network;
receiving, by the trusted network entity from the DPU over the network the other digital signature; and
verifying, by the trusted network entity, the other digital signature with a public key of the DPU.

3. The method according to claim 1, further comprising deleting, by the DPU, the verifiable message responsively to the verification of the digital signature to prevent a replay attack based on the verifiable message.

4. The method according to claim 1, further comprising detecting, by a Wake-on-LAN (WoL) detector of the DPU, receipt of the secure reset request from the trusted network entity.

5. The method according to claim 1, wherein the issuing includes issuing, by the DPU, the reset command to selectively reset the at least one processing core of the DPU to self reset without rebooting the central processing unit of the host device connected to the DPU.

6. A method of securing remote selective reset of at least one processing core of a data processing unit (DPU) in a network while preventing illicit reset of the at least one processing core of the DPU, the method comprising:
  in a remote selective reset set up phase:
    receiving, by the DPU, a verifiable message supply request from a trusted network entity over the network;
    generating and storing, by the DPU, a verifiable message; and
    sending, by the DPU, the verifiable message to the trusted network entity over the network; and
  in a remote selective reset initiation phase:
    using the verifiable message to prevent a replay attack;
    receiving, by the DPU, from the trusted network entity over the network a remote selective reset request including a digital signature of the verifiable message signed by the trusted network entity using a private key of the trusted network entity;
    verifying, by the DPU, the digital signature with a public key of the trusted network entity and the verifiable message previously stored by the DPU to verify that the trusted network entity is authorized to request remote selective reset of the at least one processing core and that the previously stored verifiable message matches the verifiable message used by the trusted network entity to generate the signature; and
    issuing, by the DPU, a reset command to selectively reset the at least one processing core of the DPU to self reset while a central processing unit of a host device connected to the DPU remains operational and unaffected by the reset command.

7. The method according to claim 6, further comprising:
  signing, by the DPU, the verifiable message with a private key of the DPU yielding another digital signature of the verifiable message; and
  providing, by the DPU the other digital signature to the trusted network entity over the network.

8. The method according to claim 6, further comprising deleting, by the DPU, the verifiable message responsively to the verification of the digital signature to prevent a replay attack based on the verifiable message.

9. The method according to claim 6, further comprising detecting, by a Wake-on-LAN (WoL) detector of the DPU, receipt of the secure reset request from the trusted network entity.

10. The method according to claim 6, wherein the issuing includes issuing, by the DPU, the reset command to selectively reset the at least one processing core of the DPU to self reset without rebooting the central processing unit of the host device connected to the DPU.

11. A system for securing remote selective reset of at least one processing core of a data processing unit (DPU) in a network while preventing illicit reset of the at least one processing core of the DPU, the system comprising: the DPU and a trusted network entity, wherein:
  in a remote selective reset set up phase:
    the trusted network entity is to send a verifiable message supply request to the DPU;
    the DPU is to receive the verifiable message supply request from the trusted network entity over the network;
    the DPU is to generate and store a verifiable message;
    the DPU is to send the verifiable message to the trusted network entity over the network; and
    the trusted network entity is to receive the verifiable message; and
  in a remote selective reset initiation phase:
    the trusted network entity and the DPU are to use the verifiable message to prevent a replay attack;
    the trusted network entity is to sign the verifiable message with a private key of the trusted network entity to create a digital signature;
    the trusted network entity is to send a remote selective reset request including the digital signature to the DPU;
    the DPU is to receive from the trusted network entity over the network the remote selective reset request including the digital signature;
    the DPU is to verify the digital signature with a public key of the trusted network entity and the verifiable message previously stored by the DPU to verify that the trusted network entity is authorized to request remote selective reset of the at least one processing core and that the stored verifiable message matches the verifiable message used by the trusted network entity to generate the signature; and
    the DPU is to issue a reset command to selectively reset the at least one processing core of the DPU to self reset while a central processing unit of a host device connected to the DPU remains operational and unaffected by the reset command.

12. The system according to claim 11, wherein:
  the DPU is to sign the verifiable message with a private key of the DPU yielding another digital signature of the verifiable message;
  the DPU is to provide the other digital signature to the trusted network entity over the network;
  the trusted network entity is to receive from the DPU over the network the other digital signature; and
  the trusted network entity is to verify the other digital signature with a public key of the DPU.

13. The system according to claim 11, wherein the DPU is to delete the verifiable message responsively to the verification of the digital signature to prevent a replay attack based on the verifiable message.

14. The system according to claim 11, wherein the DPU includes a Wake-on-LAN (WoL) detector to detect receipt of the secure reset request from the trusted network entity.

15. The system according to claim 11, further comprising the host device including the central processing unit, wherein the DPU is to issue the reset command to selectively reset the at least one processing core of the DPU to self reset without rebooting the central processing unit of the host device connected to the DPU.

16. A data processing unit (DPU) device for securing remote selective reset of at least one processing core of the DPU while preventing illicit reset of the at least one processing core of the DPU, the DPU comprising:
  a network interface controller;
  the at least one processing core;
  processing circuitry to, in a remote selective reset set up phase:

receive a verifiable message supply request from a trusted network entity over a network;

generate and store a verifiable message; and send the verifiable message to the trusted network entity over the network; and wherein in a remote selective reset initiation phase, the processing circuitry is to:

use the verifiable message to prevent a replay attack;

receive from the trusted network entity over the network a remote selective reset request including a digital signature of the verifiable message signed by the trusted network entity using a private key of the trusted network entity;

verify the digital signature with a public key of the trusted network entity and the previously stored verifiable message to verify that the trusted network entity is authorized to request remote selective reset of the at least one processing core and that the previously stored verifiable message matches the verifiable message used by the trusted network entity to generate the signature; and issue a reset command to selectively reset the at least one processing core of the DPU to self reset while a central processing unit of a host device connected to the DPU remains operational and unaffected by the reset command.

17. The device according to claim 16, wherein the processing circuitry is to:

sign the verifiable message with a private key of the DPU yielding another digital signature of the verifiable message; and provide the other digital signature to the trusted network entity over the network.

18. The device according to claim 16, wherein the processing circuitry is to delete the verifiable message responsively to the verification of the digital signature to prevent a replay attack based on the verifiable message.

19. The device according to claim 16, wherein the processing circuitry includes a Wake-on-LAN (WoL) detector to detect receipt of the secure reset request from the trusted network entity.

20. The device according to claim 16, wherein the processing circuitry is to issue the reset command to selectively reset the at least one processing core of the DPU to self reset without rebooting the central processing unit of the host device connected to the DPU.

* * * * *